United States Patent Office 2,965,622
Patented Dec. 20, 1960

2,965,622

DIESTER OF AN UNSATURATED MONOCARBOXYLIC ACID AND A DI(HYDROXY) COMPOUND OF A TETRA-ALKYLBENZENE, AND POLYMERS THEREOF

Calvin E. Pannell, Walnut Creek, Calif., assignor to Shell Oil Company, a corporation of Delaware No Drawing. Filed Feb. 27, 1956, Ser. No. 567,718

18 Claims. (Cl. 260—85.5)

This invention relates to a new class of unsaturated organic compounds. More particularly, the invention relates to novel unsaturated esters of polyhydroxy-substituted polyhydrocarbyl benzenes and to the polymers thereof.

Specifically, the invention provides new and particularly useful poly-unsaturated esters comprising esters of ethylenically unsaturated monocarboxylic acids and polyhydric compounds possessing at least one benzene ring substituted with from 3 to 4 hydrocarbyl side chains. As a special embodiment, the invention provides esters of alkenoic acids and polyhydric alcohols having the formulae

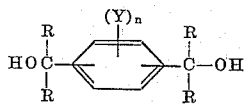

and

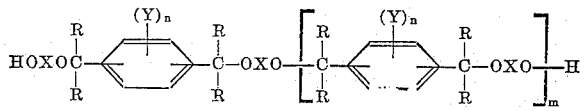

wherein Y is a monovalent alkyl radical containing no more than 8 carbon atoms, X is a bivalent hydrocarbon radical which may be substituted with from 1 to 4 hydroxy groups and contains no more than 18 carbon atoms, R is hydrogen or alkyl radical, $n$ is 3 or 4 and $m$ is an integer from 0 to 30.

The invention further provides new and useful polymers prepared by polymerizing the above-described esters by themselves or with other polymerizable organic compounds.

It is an object of the invention to provide a new class of unsaturated organic compounds. It is a further object to provide new poly-unsaturated esters of polyhydroxy-substituted polyhydrocarbyl benzenes and a method for their preparation. It is a further object to provide new poly-unsaturated esters which are particularly useful and valuable as cross-linking agents. It is a further object to provide new poly-unsaturated esters which cross-link ethylenically unsaturated materials to form products having unexpectedly high degree of hardness and resistance to deteriorating elements. It is a further object to provide new cross-linking agents which give castings having low shrinkage. It is a further object to provide new polymers and copolymers of the unsaturated esters of polyhydroxy-substituted polyhydrocarbyl benzenes which have many improved properties. It is a further object to provide new polymers which have excellent hardness and resistance to deteriorating elements and low shrinkage during formation. Other objects and advantages of the invention will be apparent from the following detailed description thereof.

It has now been discovered that these and other objects may be accomplished by the novel poly-unsaturated esters of the invention comprising esters of ethylenically unsaturated monocarboxylic acids and polyhydroxy-substituted compounds possessing at least one benzene ring substituted with from 3 to 4 hydrocarbyl side chains, and preferably alkenoic acid esters of polyhydric alcohols of the formula

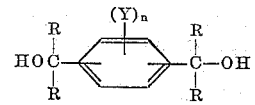

and

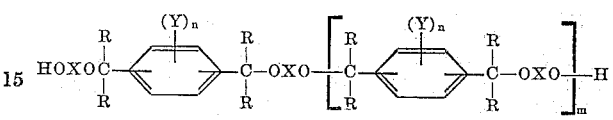

wherein Y is a monovalent alkyl radical containing no more than 8 carbon atoms, X is a bivalent hydrocarbon radical which may be substituted with from 1 to 4 hydroxy groups and contains no more than 18 carbon atoms, R is hydrogen or alkyl radical, $n$ is 3 or 4 and $m$ is an integer from 0 to 30. It has been found that these particular esters can be easily polymerized by heat alone or with the aid of catalysts to form polymeric products which are extremely hard and have excellent resistance to deteriorating elements which normally attack the benzene molecule through the ring hydrogen. Further, the esters on being polymerized, surprisingly undergo very little shrinkage and are thus distinguished from the usual poly-unsaturated compound which shrinks considerably during cure. It has also been found that these special esters may be copolymerized with other ethylenically unsaturated compounds as described hereinafter to form cross-linked products having many of the above-described unexpected properties, such as improved hardness and resistance and low shrinkage.

The polyhydric compounds used in preparing the new esters comprise the polyhydric alcohols having at least one benzene ring substituted with from 3 to 4 hydrocarbyl side chains. The hydroxyl groups are attached to the ring through aliphatic radicals, such as alkyl radicals and alkoxy radicals and are not joined directly to the ring. The hydrocarbyl radicals attached to the benzene ring may be aliphatic, cycloaliphatic or aromatic. Preferably the hydrocarbyl radicals are saturated aliphatic or cycloaliphatic radicals containing no more than 10 carbon atoms, and still more preferably alkyl radicals containing up to 8 carbon atoms, such as methyl, ethyl, isobutyl, octyl, hexyl and 2,3,4-trimethylpentyl radicals.

The polyhydric alcohols described above may be exemplified by the following: 1,4-bis(hydroxymethyl) tetramethylbenzene, 1,3-bis(hydroxymethyl) tetraoctylbenzene, 1,2-bis(alpha-hydroxyethyl) tetrahexylbenzene, 1,3-bis(alpha-hydroxybutyl) tetrapropylbenzene, 1,3-bis(hydroxymethyl) didodecyldimethylbenzene, 1,3-bis(alpha-hydroxyethyl) tetraisobutylbenzene, 1,4-bis(alpha-hydroxypentyl) tetracyclohexylbenzene, 1,4-bis(2,6-dihydroxyhexyloxymethyl) tetramethylbenzene, 1,4-bis(4-hydroxybutoxymethyl) tetramethylbenzene, 1,3-bis(2,3-dihydroxypropoxymethyl) tetramethylbenzene, 1,4 - bis-(beta-hydroxyethoxymethyl) tetrabutylbenzene, 1,4-bis-(4,5-dihydroxyheptyloxymethyl) tetrabutylbenzene, 1,4-bis(hydroxybutoxymethyl) tetrahexylbenzene, 1,3-bis(2,3,5-trihydroxydecyloxymethyl) tetraethyl benzene and 1,3-bis(3-hydroxypentoxy-1-ethyl) tetrahexylbenzene. Preferred members of this group are those of the formulae

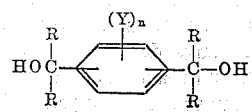

and

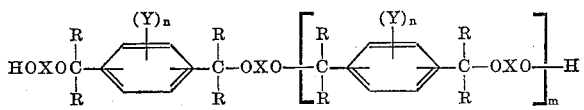

wherein Y is a monovalent alkyl radical containing no more than 8 carbon atoms, X is a bivalent hydrocarbon radical which may be substituted with from 1 to 4 hydroxy groups and contains no more than 18 carbon atoms, R is hydrogen or alkyl radical, $n$ is 3 or 4 and $m$ is an integer from 0 to 30.

Particularly preferred are the bis(hydroxymethyl) tetraalkylbenzenes wherein the alkyl groups contain up to 6 carbon atoms.

The above-described poly(hydroxyhydrocarbyl) polyhydrocarbyl benzenes are preferably obtained by hydrolyzing the corresponding poly(halohydrocarbyl) polyhydrocarbyl benzenes. The poly(halohydrocarbyl) polyhydrocarbyl benzenes are preferably obtained by halogenating a polyhydrocarbyl benzene by conventional methods. Bis(chloromethyl) tetramethylbenzene is prepared, for example, by chlorinating hexamethylbenzene. The preferred bis(chloromethyl) hydrocarbyl benzenes are preferably obtained by reacting the polyhydrocarbyl benzenes having at least two ring carbon atoms unsubstituted, such as tetramethylbenzene (durene), with formaldehyde and hydrogen chloride.

The acids used in preparing the novel esters comprise the ethylenically unsaturated monocarboxylic acids, and preferably the alkenoic acids and halo-substituted alkenoic acids, such as acrylic acid, methacrylic acid, chloroacrylic acid, 2-butenoic acid, 2,4-hexadienoic acid, 2-octanoic acid, 2,6-octadienoic acid, 8,9-dodecadienoic acid, and the like. Particularly preferred are the alkenoic acids containing up to 8 carbon atoms.

Examples of the novel esters include, among others, the diacrylate of 1,4-bis(hydroxy methyl) tetramethylbenzene, the dimethacrylate of 1,4-bis(hydroxymethyl) tetraethylbenzene, the dichloroacrylate of 1,4-bis(hydroxymethyl) tetrabutylbenzene, the diacrylate of 1,4-bis(hydroxyethoxymethyl) tetramethylbenzene, the dicrotonate of 1,4-bis(1-hydroxyethyl) tetramethylbenzene, the acrylate methacrylate of 1,3-bis(hydroxymethyl) tetrabutylbenzene, the dimethacrylate of 1,4-bis(hydroxymethyl) tetrahexylbenzene, and the dicrotonate of 1,4-bis(hydroxybutoxymethyl) tetrabutylbenzene.

The new esters can be prepared by any suitable method. They may be prepared, for example, by direct esterification of the above-described unsaturated acids and the above-described polyhydroxy-substituted polyhydrocarbyl benzenes in the presence of an esterification catalyst, by reacting the said alcohols with an acid halide in pyridine or by ester exchange reaction wherein esters of the polyhydroxy-substituted polyhydrocarbyl benzenes and/or esters of the unsaturated acids are reacted in the presence of an ester-exchange catalyst.

It is usually preferred, however, to prepare the esters by direct esterification. According to this method, the polyhydroxy-substituted polyhydrocarbyl benzene and unsaturated acid are heated together in the presence of a catalyst and the water formed during the reaction is removed, preferably by distillation.

Suitable catalysts that may be used in the direct esterification include, among others, hydrochloric acid, sulfuric acid, p-toluene sulfonic acid, ethyl sulfonic acid, hydrobromic acid, chloroacetic acid, sulfuric acid, benzene sulfonic acid, formic acid, boron and silicon fluorides, acid salts, such as mono-sodium and mono-potassium sulfates, and salts of strong acids and weak bases, such as aluminum sulfate, zinc chloride, zinc sulfate, and the like. The amount of the catalyst employed will vary over a wide range depending upon the particular reactants, catalyst, and reaction conditions employed. In most cases, the amount of catalyst will vary between 0.1% to 5% by weight of reactants. Preferred amounts of catalyst to be employed in the esterification process vary between 0.5% to 2% by weight of reactants.

The amount of the acid and alcohol to be added to the reaction mixture may vary over a considerable range. In general, it is preferred to maintain the acid in excess of an equivalent amount per equivalent of the alcohol. The equivalent ratios of acid to alcohol preferably vary between 1.1:1 to 2:1. As used herein, the express "equivalent amount" in relation to the amount of acid and alcohol refers to that amount of acid needed to esterify all of the hydroxyl groups of the alcohol molecule.

The esterification may be accomplished in the presence or absence of solvents or diluents. In case the solvents or diluents are desired, inert organic compounds, such as benzene, toluene, cyclohexanone, xylene, and the like, are generally preferred.

The temperature employed during the esterification may vary over a considerable range depending upon the type of reactants and catalysts to be employed. In most cases, the temperature will range between about 40° C. and 250° C. with a preferred range being between 60° C. and 150° C. Higher or lower temperatures may be employed if desired or necessary.

It is generally preferred to conduct the esterification in the presence of an inert atmosphere, such as nitrogen. Atmospheric, superatmospheric or subatmospheric pressures may be used.

As the unsaturated acids and resulting esters are polymerizable, it is also generally preferred to add polymerization inhibitors to the esterification mixture. Suitable inhibitors include, among others, hydroquinone, copper bronze powder, sulfur, p-phenylenediamine, tannic acid, and various amino and sulfur compounds. These inhibitors may be subsequently removed by washing, distillation, extraction, and the like.

The esters may be recovered from the reaction mixture by any suitable means, such as crystallization, extraction, evaporation, fractional precipitation, distillation, and the like.

The novel esters vary from semi-solids to white crystalline solids of relatively high melting point. They are soluble in most organic solvents, such as alcohols, ethers, esters and halogenated hydrocarbons, and are compatible with various oils and synthetic resins, such as cellulose ethers and esters and vinyl resins, such as polyvinyl chloride and polystyrene.

The novel esters are particularly valuable in the formation of polymeric products as they may be polymerized alone or in combination with other unsaturated compounds to produce products having excellent hardness and resistance to deteriorating elements and surprisingly low shrinkage during formation.

The compounds that may be copolymerized with the novel esters include those having one or more ethylenic groups and preferably one or more $CH_2=C=$ groups. One group of such compounds include the organic compounds containing a single $CH_2=C=$ group and no other polymerizable group, such as styrene, alpha-methyl styrene, acrylonitrile, methacrylonitrile, vinyl chloride, vinylidene chloride, methyl methacrylate, methyl acrylate, ethyl acrylate, allyl acetate, vinyl acetate, vinyl propionate, vinyl benzoate, allyl benzoate, allyl stearate, vinyl cyclohexanecarboxylate, allyl formate, methallyl chloroacetate and the like.

Another group of copolymerizable compounds consists of those compounds having two or more conjugated carbon-to-carbon double bonds, such as butadiene and substituted butadiene, as well as polymers of acetylene, such as vinyl and divinyl acetylene. Others are unsaturated cyclic compounds such as coumarone, indene, furfural and cyclohexene.

Some of the most important copolymerizable compounds, however, have two or more polymerizable nonconjugated double bonds. An important subclass consists of the unsaturated aliphatic polyesters of saturated polybasic acids, examples of which are divinyl, diallyl and dimethallyl esters of oxalic, malonic, citric and tartaric acids. Another subclass consists of unsaturated aliphatic polyethers of saturated polyhydric alcohols, such as divinyl, diallyl and dimethallyl ethers of glycol, diethylene glycol, trimethylene glycol, and similar derivatives of diglycerol, mannitol, sorbitol and the like. Another subclass consists of the unsaturated aliphatic organic acid polyesters of polyhydric alcohols, such as acrylic and methacrylic polyesters of glycols. Another subclass consists of the unsaturated aliphatic alcohol esters of the unsaturated aliphatic acids, such as the vinyl, allyl and methallyl esters of acrylic, methacrylic acid and the like. Still another class consists of the unsaturated polyesters of dibasic aromatic acids, such as divinyl, diallyl and dimethallyl esters of phthalic acid, isophthalic acid, and the naphthalene dicarboxylic acids. Instead of the esters and ethers, the corresponding sulfur and nitrogen compounds, i.e., thio-esters, thio-ethers, amides and amines may be used.

The proportions to be used in producing the novel copolymers will vary over a wide range depending upon the specific reactants and the type of product desired. Copolymers having improved hardness and resistance to deteriorating elements may be obtained when the amount of the novel unsaturated esters of the polyhydroxy-substituted polyhydrocarbyl benzenes are employed in amounts varying from 1% up to 95% by weight of the material being polymerized. Copolymers having exceptionally fine properties are obtained when the amount of the novel unsaturated ester is maintained between 5% and 80% by weight.

The polymerization may be accomplished by any suitable method. While the polymerization may be accomplished by heat alone, it is generally preferred to heat the monomers in the presence of a free radical yielding catalyst. The polymerization may be effected in bulk, in the presence of solvents, or in an aqueous emulsion or suspension. If solvents are employed, they may be solvents for the monomers and polymer, or they may be a solvent for monomers and non-solvent for the polymer. Examples of solvents that may be utilized in the polymerization reaction are benzene, toluene, cyclohexane, and the like, and mixtures thereof.

In making the copolymers, the monomers may all be added at the beginning of the reaction or in case a more homogeneous product is desired, one or more of the monomers may be added during the course of the polymerization so as to keep the ratio of monomers in the reaction mixture at the desired level.

Catalysts that may be used may be exemplified by benzoyl peroxide, benzoyl acetyl peroxide, tertiary-butyl hydroperoxide, 2,2-bis(tertiary-butyl peroxy) butane, tertiary-butyl perbenzoate, cumene hydroperoxide, tertiary-butyl peracetate, tertiary-butyl pelargonate, and the like, and mixtures thereof. The amount of the catalyst added may vary over a considerable range. In general, the amount will vary from 0.1% to 5% by weight of the material being polymerized. Preferred amounts vary from 1% to 2% by weight. If desired, air may be dispersed through the reaction mixture to act as a catalyst in effecting the polymerization.

The temperature employed in the polymerization may vary over a considerable range depending upon the material being polymerized, catalyst selected, etc. In most cases, the temperature will vary from 50° C. to about 300° C. Preferred temperatures range from 100° C. to 200° C. Atmospheric, superatmospheric or subatmospheric pressures may be utilized. In those cases where the operating temperature is above the boiling point of the polymerization mixture, it is desirable to use superatmospheric pressures at least equal to the autogenic pressures.

The polymerization may be carried to completion without substantial interruption or it may be stopped at any point short of completion. Incomplete polymerization may be used for the production of syrup which may be further worked and eventually substantially completely polymerized.

The unreacted materials, if any, may be separated from the polymer by any suitable means, such as solvent extraction, distillation, filtration, and the like. The separated polymer may then be worked up in any known or special manner.

The polymers of the present invention may be used in the preparation of various cast and molded articles, such as combs, buttons, containers, window glass, tools, machine parts, and the like. The partially polymerized product may be used in the preparation of coating compositions, laminated articles, impregnating compositions and the like.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

*Example I*

This example illustrates the preparation and properties of the diacrylate of 1,4-bis(hydroxymethyl) tetramethylbenzene.

43.2 parts of acrylic acid, 15 parts of an ion exchange catalyst and 1.8 parts of hydroquinone were placed in a reaction kettle equipped with stirrer, $N_2$ inlet, thermometer, Stark and Dean trap and reflux condenser. This mixture was heated to remove moisture and then 13 parts of 1,4-bis(hydroxymethyl) tetramethylbenzene was added. The mixture was maintained at reflux and after about 5 hours of heating, 13 parts of 1,4-bis(hydroxymethyl) tetramethylbenzene was added and after one more hour, 13 more parts of the 1,4-bis(hydroxymethyl) tetramethylbenzene was added. After approximate theoretical amount of water had been collected overhead (about 12 hours) the reaction was stopped and the mixture filtered. Methanol was then added to the syrupy residue and a white solid formed. The solid was crystallized by extraction with heptane. The resulting ester which was identified as the diacrylate of 1,4-bis(hydroxymethyl) durene was a white crystalline solid having a melting point of 109–115° C. Analysis ester value 0.63 eq./100 g. theory 0.663 eq./100 g.

The diacrylate of 1,4-bis(hydroxymethyl) tetramethylbenzene produced above was heated at 150° C. for a few hours and formed very hard tough casting having improved resistance to solvents and water.

10 parts of the diacrylate of 1,4-bis(hydroxymethyl) tetramethyl-benzene produced above was combined with 90 parts of methyl methacrylate and 1 part of benzoyl peroxide and the mixture heated at 85° C. The mixture set up to form a hard clear casting having a Barcol Hardness of 37. A casting prepared by the same method for ethylene glycol dimethacrylate had a Barcol Hardness of only 27. There was much less shrinkage during the formation of the casting than in the case of the ethylene glycol dimethacrylate.

*Example II*

This example illustrates the preparation and properties of the dimethacrylate of 1,4-bis(hydroxymethyl) tetramethylbenzene.

300 parts of benzene, 1 part of p-toluenesulfonic acid, 4 parts of hydroquinone and 86 parts of methacrylic acid were placed in a reaction kettle described in Example I. The mixture was heated to remove moisture and then 16 parts of 1,4-bis(hydroxymethyl) tetramethylbenzene was added. The mixture was kept at reflux for 1 hour and then 16 more parts of 1,4-bis(hydroxymethyl) tetramethylbenzene added. After one more hour, 16 more parts of 1,4-bis(hydroxymethyl) tetramethylbenzene was added. After approximate theoretical amount of water had been collected overhead, the reaction was stopped. 2 parts of NaHCO$_3$ in 30 parts of water was added and the mixture heated and filtered. The residue was extracted with hot benzene and filtered. The resulting white solid was identified as the dimethacrylate of 1,4-bis(hydroxymethyl) tetramethylbenzene. The product had a melting point of about 96–98° C. Ester value 0.59 eq./100 g.

A sample of the dimethacrylate produced above was heated at 150° C. and in a short time formed a hard tough casting having a Barcol Hardness of 47 and improved resistance to solvents and water.

10 parts of the dimethacrylate is combined with 90 parts of methyl methacrylate and 1 part of benzoyl peroxide and the mixture heated at 85° C. The mixture sets up in a short period to form a hard clear casting. There was also much less shrinkage during the formation of the casting than in the case of the ethylene glycol dimethacrylate.

*Example III*

This example illustrates the preparation and properties of the diacrylate of 1,4-bis(hydroxyethoxymethyl) tetramethylbenzene.

300 parts of benzene, 1 part of p-toluenesulfonic acid, 1 part of hydroquinone and 52 parts of acrylic acid were placed in a reaction kettle described in Example I. The mixture was heated to remove moisture and then 14 parts of the 1,4-bis(hydroxyethoxymethyl) tetramethylbenzene added. The mixture was kept at reflux for about 4 hours and then 14 parts of 1,4-bis(hydroxyethoxymethyl) tetramethylbenzene was again added. A third and fourth portion of 14 parts of the 1,4-bis(hydroxyethoxymethyl) tetramethylbenzene were added at about 3 hour intervals. After the theoretical amount of water had been collected overhead, the reaction was stopped. 2 parts of NaHCO$_3$ in 30 parts of water was added and the mixture heated and filtered. The residue was extracted with hot benzene and filtered. The resulting product, which is a soft solid, is identified as the diacrylate of 1,4-bis(hydroxyethoxymethyl) tetramethylbenzene.

A sample of the diacrylate produced above was heated at 150° C. and in a short time formed a hard tough casting having improved resistance to solvents.

30 parts of the dimethacrylate produced above is also combined with 70 parts of acrylonitrile and 1 part of benzoyl peroxide and the mixture heated at 65° C. The mixture sets up in a short time to form a very clear casting which is very hard and has good resistance to solvents and water. There is no noticeable shrinkage during formation of the casting.

10 parts of the dimethacrylate is combined with 90 parts of methyl methacrylate and 1 part of benzoyl peroxide and the mixture heated at 85° C. The mixture sets up in a short period to form a very clear casting with no noticeable shrinkage during formation.

*Example IV*

This example illustrates the preparation and properties of the dicrotonate of 1,4-bis(hydroxyethoxymethyl) tetraethylbenzene.

300 parts of benzene, 1 part of p-toluenesulfonic acid, 1 part of hydroquinone and 51 parts of crotonic acid are placed in a reaction kettle described in Example I. The mixture is heated to remove moisture and then 13 parts of 1,4-bis(hydroxyethoxymethyl) tetraethylbenzene added. The mixture is kept at reflux for about 4 hours and then 13 parts of 1,4-bis(hydroxyethoxymethyl) tetraethylbenzene is again added. A third and fourth portion of 1,4-bis(hydroxyethoxymethyl) tetraethylbenzene are added at about 3 hour intervals. After the theoretical amount of water has been collected overhead, the reaction is stopped. 2 parts of NaHCO$_3$ in 30 parts of water is added and the mixture heated and filtered. The residue is extracted with hot benzene and filtered. The resulting product, which is a thick viscous liquid, is identified as dicrotonate of 1,4-bis(hydroxyethoxymethyl) tetraethylbenzene.

A sample of the dicrotonate produced above is heated at 150° C. and in a short time forms a hard tough casting having good resistance to solvents and water.

About 40 parts of the dicrotonate of 1,4-bis(hydroxyethoxymethyl) tetraethylbenzene produced above is combined with 60 parts of styrene and 1 part of benzoyl peroxide and the mixture heated at 65° C. The mixture sets up in a short time to form a very clear casting which is hard and has good chemical and water resistance.

Related copolymers are obtained by replacing the styrene in the above process with equal amounts of each of the following: alpha-methyl styrene, chlorostyrene and p-tert-butylstyrene.

*Example V*

This example illustrates the preparation and properties of the diacrylate of 1,4-bis(hydroxymethyl) tetraisopropylbenzene.

300 parts of benzene, 1 part of p-toluenesulfonic acid, 1 part of hydroquinone and 43.2 parts of acrylic acid are placed in the reaction kettle described in Example I. The mixture is heated to remove moisture and then 16 parts of 1,4-bis(hydroxymethyl) tetraisopropylbenzene added. The mixture is kept at reflux for about 4 hours and then 16 parts of 1,4-bis(hydroxymethyl)tetraisopropylbenzene is again added. A third and fourth portion of 16 parts of the alcohol are added at about 3 hour intervals. After approximate theoretical amount of water has been collected, the reaction is stopped. 2 parts of NaHCO$_3$ in 30 parts of water is added and the mixture heated and filtered. The residue is extracted with hot benzene and filtered. The resulting product, which is a white solid, is identified as the diacrylate of 1,4-bis(hydroxymethyl) tetraisopropylbenzene.

A sample of the diacrylate produced above is heated at 150° C. and in a short time forms a hard tough casting having good resistance to solvents and water.

About 30 parts of the diacrylate produced above is combined with 70 parts of diallyl phthalate and 1 part of benzoyl peroxide and the mixture heated at 80° C. The mixture sets up in a short time to form a very clear, very hard casting which has good chemical and water resistance.

Related copolymers are obtained by replacing the diallyl phthalate in the above process with equal amounts of each of the following: diallyl adipate, diallyl terephthalate and dimethallyl succinate.

I claim as my invention:

1. A diester of a monocarboxylic acid selected from the group consisting of the alkenoic acids, chloro-substituted alkenoic acids and alkadienoic acids, said acid containing from 3 to 12 carbon atoms per molecule, and a 1,4-di(hydroxyalkyl) benzene having 4 alkyl hydrocarbon side chains directly attached to the benzene nucleus, each of the side chains, and each of the hydroxyalkyl groups in said 1,4-di(hydroxyalkyl) benzene containing from 1 to 8 carbon atoms.

2. A diester as in claim 1 wherein the di(hydroxyalkyl) compound is a 1,4-bis(hydroxymethyl) tetraalkylbenzene wherein each of the alkyl groups contains from 1 to 6 carbon atoms.

3. A polymer of an unsaturated diester defined in claim 1.

4. A diester of a 1,4-bis(hydroxyalkyl) tetraalkylbenzene wherein each of the hydroxyalkyl groups and each of the alkyl groups contains from 1 to 8 carbon atoms, and acrylic acid.

5. An acrylic acid diester of 1,4-bis(hydroxyalkoxyalkyl) tetraalkylbenzene wherein each of the hydroxyalkoxy groups contains from 1 to 18 carbon atoms and wherein each of the named alkyl groups contains from 1 to 8 carbon atoms.

6. Acrylic acid diester of 1,4-bis(hydroxymethyl) tetramethylbenzene.

7. Methacrylic acid diester of 1,4-bis(hydroxymethyl) tetramethylbenzene.

8. Acrylic acid diester of 1,4-bis(hydroxyethoxymethyl) tetramethylbenzene.

9. Crotonic acid diester of 1,4-bis(hydroxypropoxymethyl) tetraethylbenzene.

10. An insoluble infusible homopolymer of the acrylic acid diester of 1,4-bis(hydroxymethyl) tetramethylbenzene.

11. An insoluble infusible copolymer of the acrylic acid diester of 1,4-bis(hydroxymethyl) tetramethylbenzene and an ethylenically unsaturated compound containing a $CH_2=C=$ group.

12. A copolymer of methyl methacrylate and the acrylic acid diester of 1,4-bis(hydroxymethyl) tetramethylbenzene.

13. A copolymer of acrylonitrile and the acrylic acid diester of 1,4-bis(hydroxymethyl) tetramethylbenzene.

14. A polymer of the methacrylic acid diester of 1,4-bis(hydroxymethyl) tetramethylbenzene.

15. A polymer of the crotonic acid diester of 1,4-bis(hydroxypropoxymethyl) tetraethylbenzene.

16. A diester of an alkenoic monocarboxylic acid of from 3 to 8 carbon atoms and a di(hydroxyalkyl) compound of the group consisting of di(hydroxyalkyl) tetraalkyl benzenes and di(hydroxyalkoxyalkyl) tetraalkyl benzenes, having the following structural formulae, respectively, I.
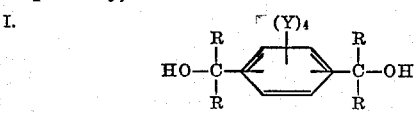

and

II.
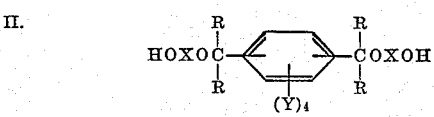

wherein each Y is a monovalent alkyl radical having from 1 to 8 carbon atoms, each R is selected from the group consisting of hydrogen and alkyl having from 1 to 8 carbon atoms and each X is a bivalent saturated aliphatic hydrocarbon radical having from 1 to 18 carbon atoms.

17. A polymer of a diester of a monocarboxylic acid selected from the group consisting of the alkenoic acids, chloro-substituted alkenoic acids and alkadienoic acids, said acid containing from 3 to 12 carbon atoms per molecule, and a di(hydroxyalkyl) compound of the group consisting of di(hydroxyalkyl) tetra-alkyl benzenes and di(hydroxyalkoxyalkyl) tetra-alkyl benzenes, having the following structural formulae, respectively, I.
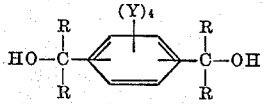

and

II.
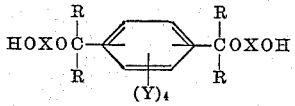

wherein each Y is a monovalent alkyl radical having from 1 to 8 carbon atoms, each R is selected from the group consisting of hydrogen and alkyl having from 1 to 8 carbon atoms and each X is a bivalent saturated aliphatic hydrocarbon radical having from 1 to 18 carbon atoms.

18. A diester of a monocarboxylic acid selected from the group consisting of the alkenoic acids, chloro-substituted alkenoic acids, and alkadienoic acids, said acid containing from 3 to 12 carbon atoms per molecule, and a di(hydroxyalkyl) compound of the group consisting of di(hydroxyalkyl) tetra-alkyl benzenes and di(hydroxyalkoxyalkyl) tetra-alkyl benzenes, having the following structural formulae, respectively, I.
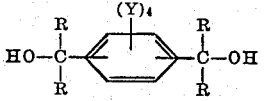

and

II.
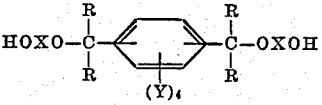

wherein each Y is a monovalent alkyl radical having from 1 to 8 carbon atoms, each R is selected from the group consisting of hydrogen and alkyl having 1 to 8 carbon atoms and each X is a bivalent saturated aliphatic hydrocarbon radical having from 1 to 18 carbon atoms.

References Cited in the file of this patent

UNITED STATES PATENTS

| | | |
|---|---|---|
| 2,129,667 | Barrett et al. | Sept. 13, 1938 |
| 2,129,685 | Graves | Sept. 13, 1938 |
| 2,359,622 | Coleman et al. | Oct. 3, 1944 |
| 2,456,318 | Ramler | Dec. 14, 1948 |
| 2,471,789 | Soday | May 31, 1949 |
| 2,575,440 | Bradley | Nov. 20, 1951 |
| 2,830,078 | Fekete | Apr. 8, 1958 |